(12) United States Patent
Yoo

(10) Patent No.: US 12,455,640 B2
(45) Date of Patent: Oct. 28, 2025

(54) INPUT DEVICE FOR VIRTUAL REALITY AND AUGMENTED REALITY

(71) Applicant: Sung Mok Yoo, Hwaseong-si (KR)

(72) Inventor: Sung Mok Yoo, Hwaseong-si (KR)

( * ) Notice: Subject to any disclaimer, the term of this patent is extended or adjusted under 35 U.S.C. 154(b) by 0 days.

(21) Appl. No.: 18/834,524

(22) PCT Filed: Jun. 28, 2022

(86) PCT No.: PCT/KR2022/009220
§ 371 (c)(1),
(2) Date: Jul. 30, 2024

(87) PCT Pub. No.: WO2023/167371
PCT Pub. Date: Sep. 7, 2023

(65) Prior Publication Data
US 2025/0110584 A1  Apr. 3, 2025

(30) Foreign Application Priority Data
Mar. 4, 2022 (KR) .................. 10-2022-0027925

(51) Int. Cl.
*G06F 3/033* (2013.01)
*G06F 3/0354* (2013.01)
(Continued)

(52) U.S. Cl.
CPC ........ *G06F 3/03545* (2013.01); *G06F 3/0383* (2013.01); *G06F 3/04162* (2019.05);
(Continued)

(58) Field of Classification Search
CPC ............. G06F 3/03545; G06F 3/04162; G06F 3/0383; G06F 2203/014; G06F 2203/04105; G06F 2203/04106
See application file for complete search history.

(56) References Cited

U.S. PATENT DOCUMENTS 10,318,022 B2  6/2019  Mishalov et al.
2009/0236153 A1  9/2009  Kyung et al.
(Continued)

FOREIGN PATENT DOCUMENTS

KR  10-0769980 B1  10/2007
KR  10-2011-0091893 A  8/2011
(Continued)

OTHER PUBLICATIONS

KR Office Action dated Mar. 25, 2022 as received in Application No. 10-2022-0027925.
(Continued)

*Primary Examiner* — Lisa S Landis
(74) *Attorney, Agent, or Firm* — Maschoff Brennan

(57) ABSTRACT

Provided is an input device for virtual reality (VR) and augmented reality, the input device including: a device body provided at an end a head part to be utilized for VR and AR purposes; an internal sensor embedded in the device body and comprising an accelerometer for sensing a speed and a direction of the device body and at least one position sensor for sensing a position of the device body; an external sensor provided at an outside of the device body and having a touch sensor for sensing touch sensitivity of the head part with respect to a screen of a predetermined electronic device; and a controller connected to the internal sensor and the external sensor and configured to control an operation of the electronic device or control implementation of the VR and the AR based on a sensed value of the internal sensor and the external sensor.

1 Claim, 10 Drawing Sheets

(51) Int. Cl.
*G06F 3/038* (2013.01)
*G06F 3/041* (2006.01)

(52) U.S. Cl.
CPC .............. *G06F 2203/014* (2013.01); *G06F 2203/04105* (2013.01); *G06F 2203/04106* (2013.01)

(56) References Cited

U.S. PATENT DOCUMENTS

| | | |
|---|---|---|
| 2010/0142428 A1 | 6/2010 | Song |
| 2016/0078277 A1* | 3/2016 | Sprigg ............... G06F 21/32 382/119 |
| 2017/0068341 A1 | 3/2017 | Zimmerman et al. |
| 2020/0186786 A1* | 6/2020 | Gibby ............... H04N 13/327 |
| 2021/0140569 A1 | 5/2021 | Abe et al. |
| 2021/0155030 A1* | 5/2021 | Kurani ............... G06F 3/016 |

FOREIGN PATENT DOCUMENTS

| | | |
|---|---|---|
| KR | 10-1454814 B1 | 11/2014 |
| KR | 10-2016-0072306 A | 6/2016 |
| KR | 10-2016-0081855 A | 7/2016 |
| KR | 10-2018-0000009 A | 1/2018 |
| KR | 10-2019-0110610 A | 9/2019 |
| KR | 10-2019-0122735 A | 10/2019 |
| KR | 10-2021-0028740 A | 3/2021 |
| KR | 10-2410654 B1 | 6/2022 |

OTHER PUBLICATIONS

KR Decision to Grant Dated Jun. 13, 2022 as received in Application No. 10-2022-0027925.

* cited by examiner

[FIG. 1]
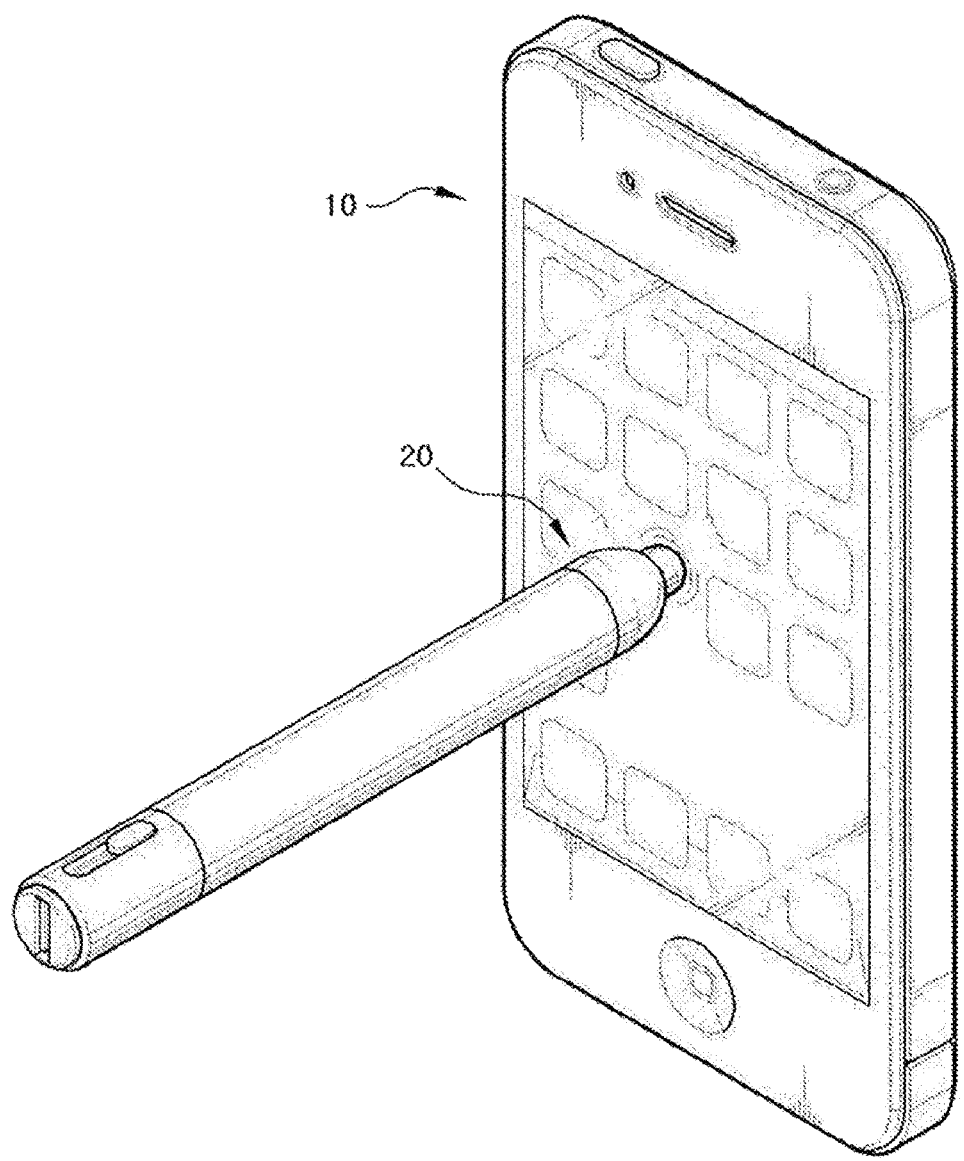

[FIG. 2]
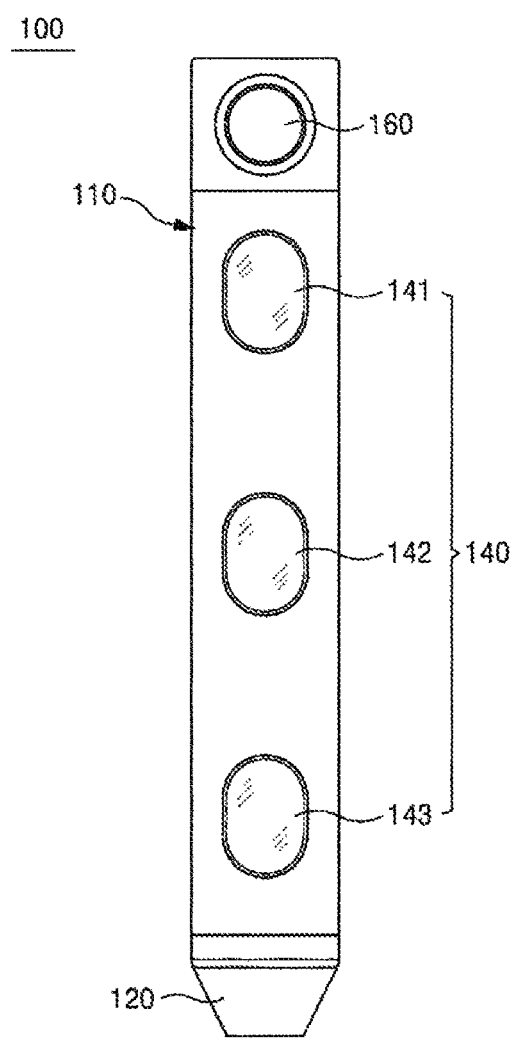

[FIG. 3]
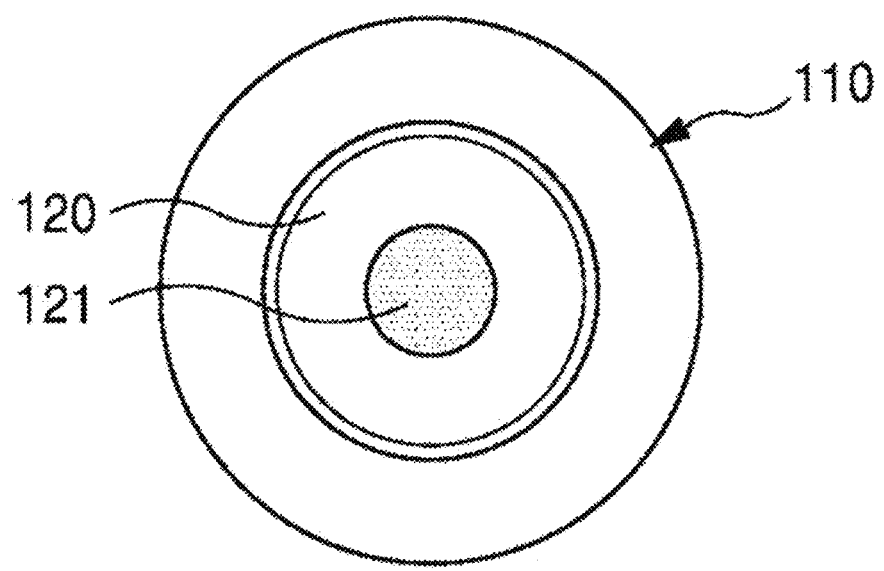

[FIG. 4]
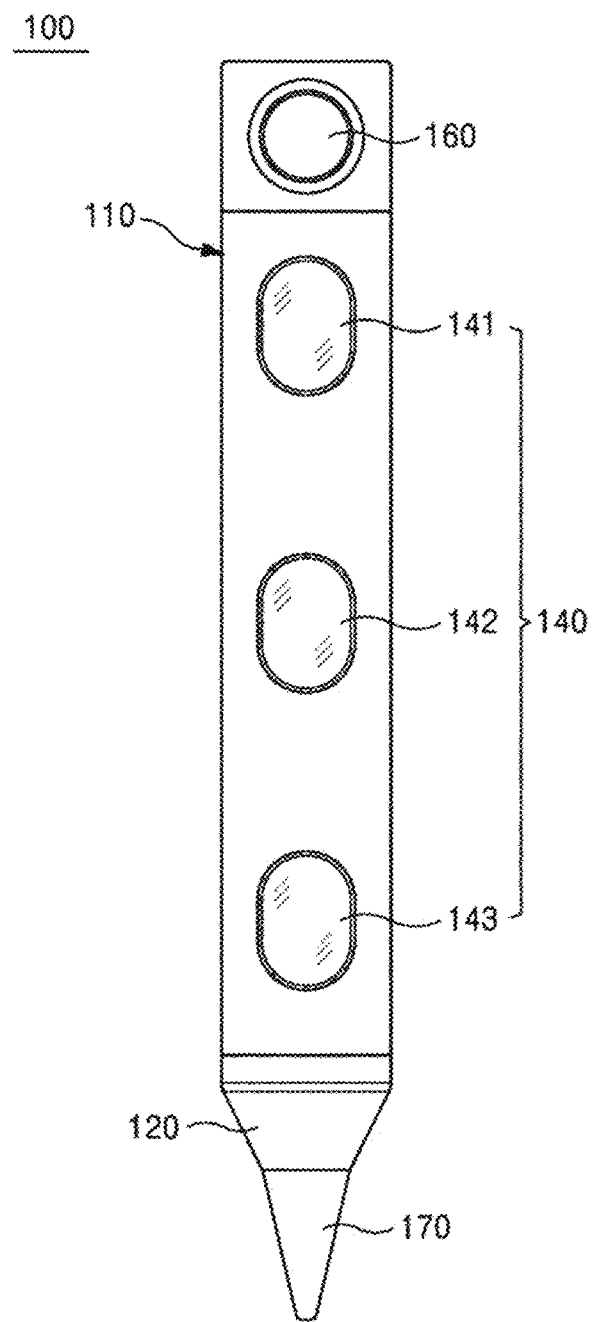

[FIG. 5]
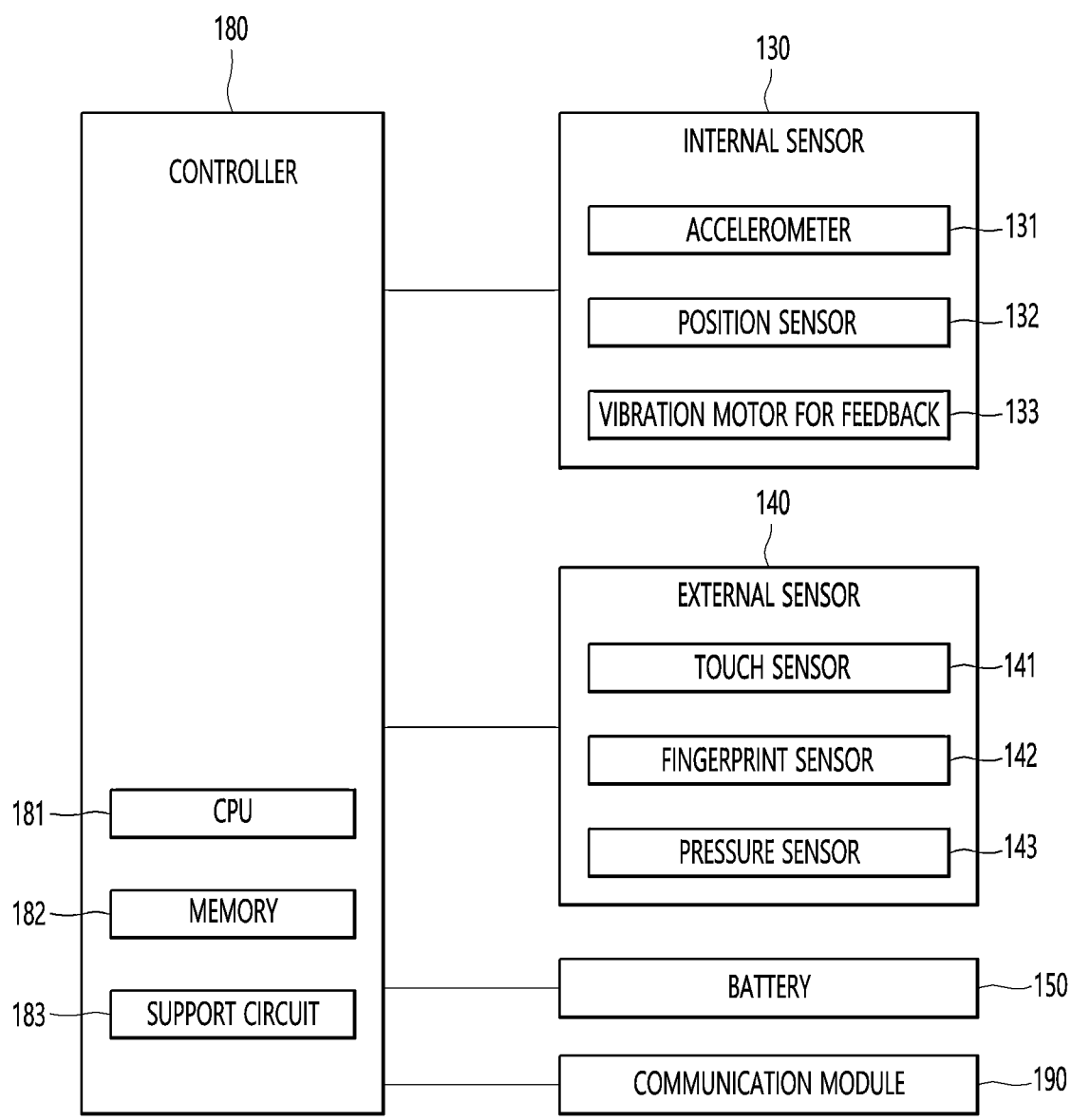

[FIG. 6]
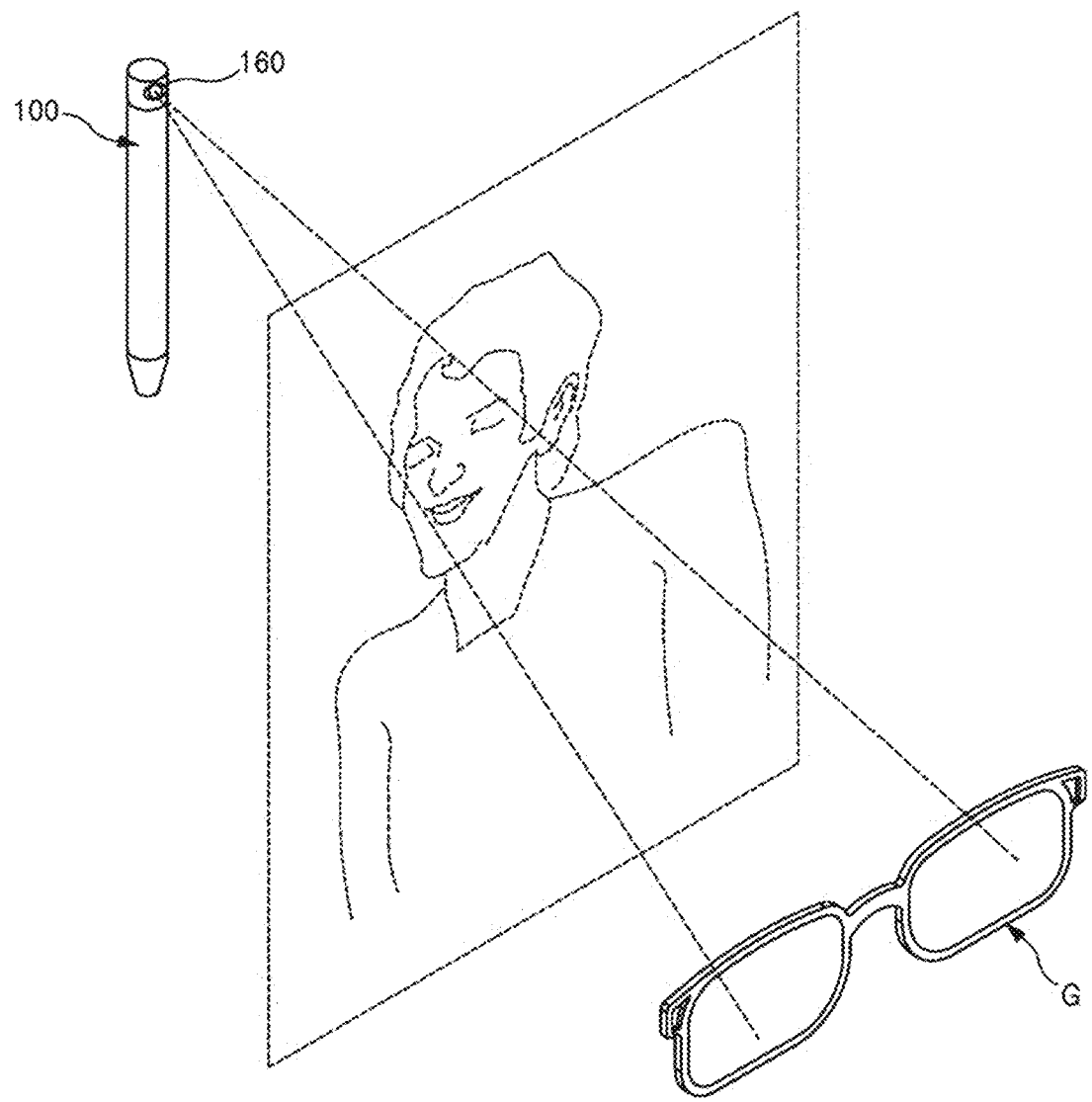

[FIG. 7]
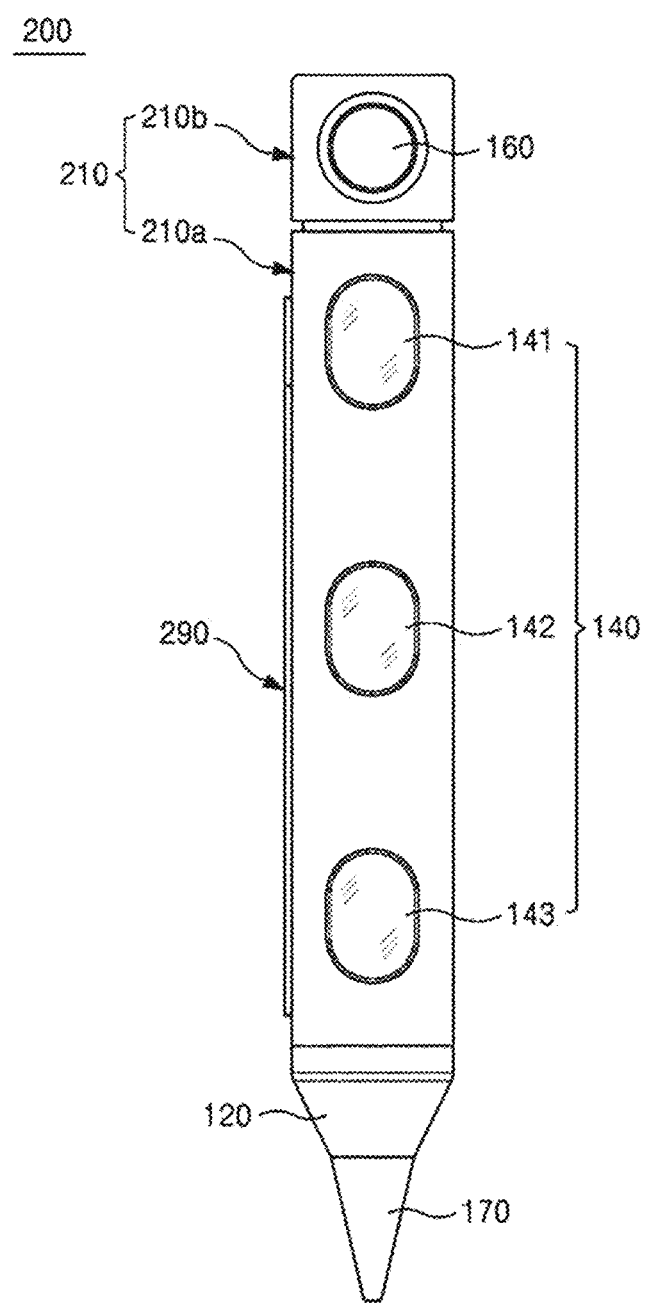

[FIG. 8]
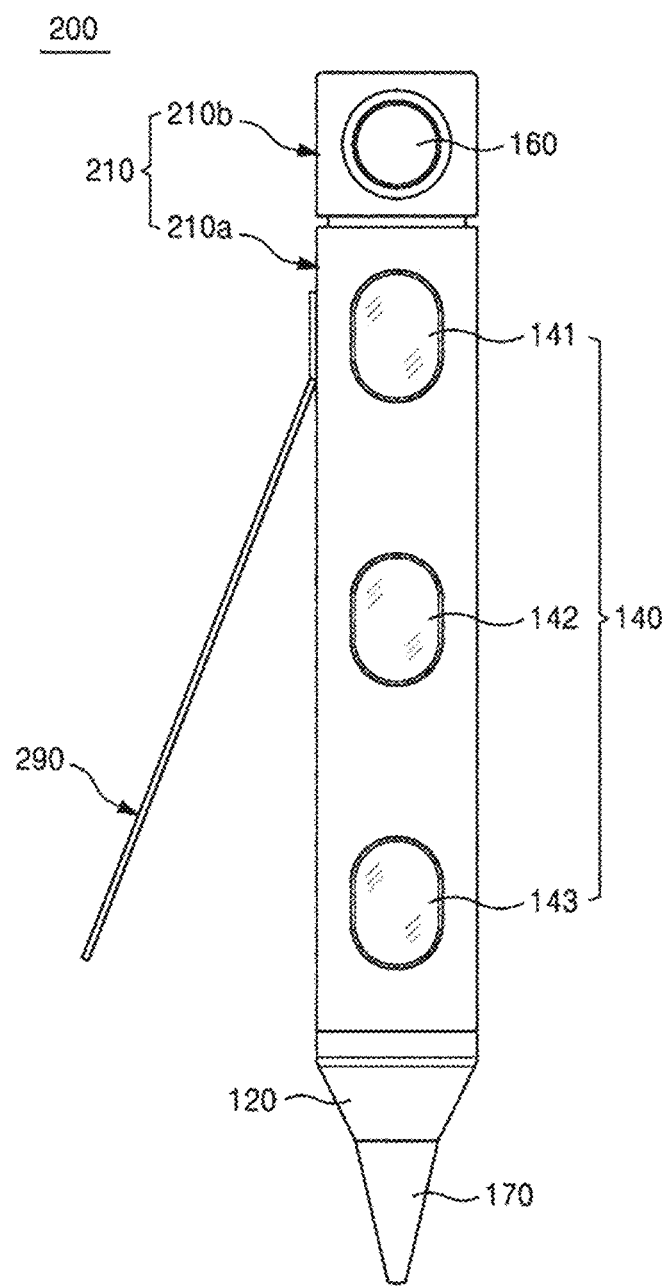

[FIG. 9]
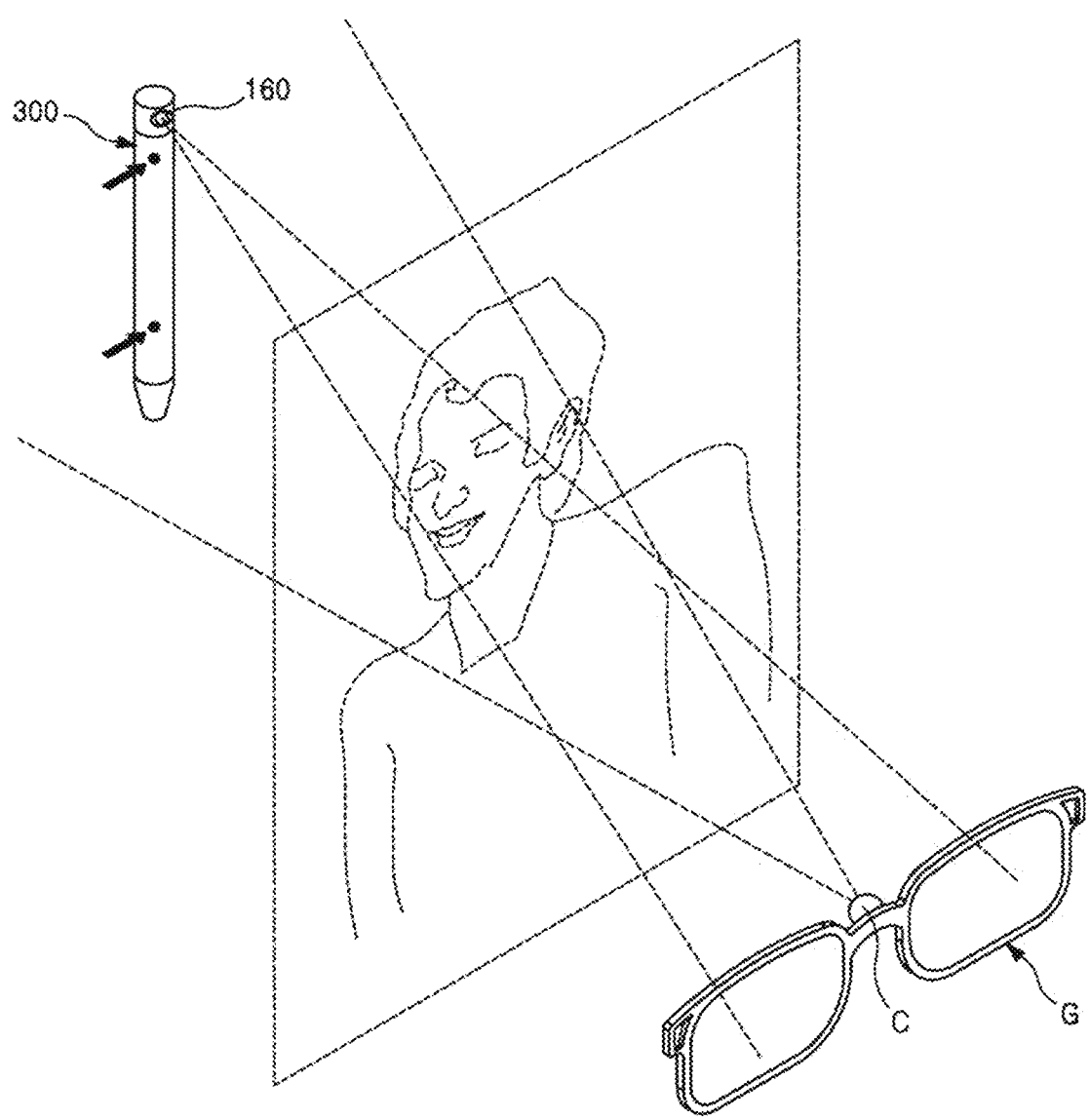

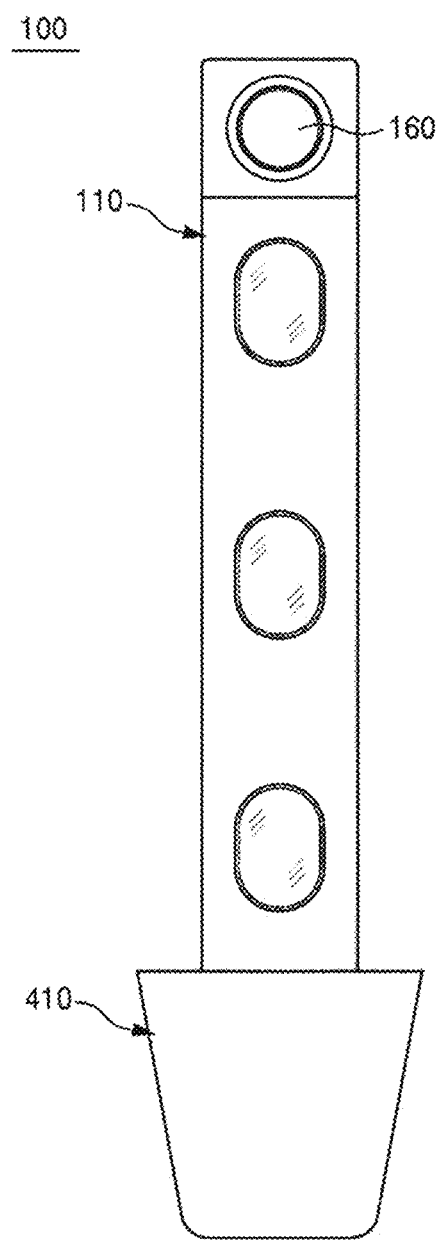
[FIG. 10]

INPUT DEVICE FOR VIRTUAL REALITY AND AUGMENTED REALITY

TECHNICAL FIELD

The present disclosure relates to an input device for virtual reality (VR) and augmented reality (AR), and more particularly, to an input device for VR and AR with significantly improved functionality compared to an existing technology, so that the input device is capable of being used as an input tool for multiple purposes, for example, for VR and AR.

BACKGROUND ART

An input device refers to an input tool for executing a predetermined electronic device, for example, a smart phone, a tablet PC, or a pad.

One of the most common types of input device is shown in FIG. 1. An input device 20 shown in FIG. 1 is a tool, so-called a touch pen 20, and is used to operate a tablet PC or a smart phone 10. The touch pen 20 may be provided integrally or may be provided separately.

Although the input device 20 in the form shown in FIG. 1 is the most common type, this type of the input device 20 is only used for executing an application in the corresponding smart phone 10, taking notes, etc. as described above, and lacks some other functionality.

For example, considering the fact that the input device 20 shown in FIG. 1 cannot be used for VR and AR purposes, the functions of the input device 20 are considerably limited.

RELATED DOCUMENTS (Patent Document 1) Korean Patent Application No. 10-2015-0190970
(Patent Document 2) Korean Patent Application No. 10-2014-0179113
(Patent Document 3) Korean Patent Application No. 10-2019-0122735
(Patent Document 4) Korean Patent Application No. 10-2011-0091893

DISCLOSURE

Technical Problem

The present disclosure provides an input device for virtual reality (VR) and augmented reality (AR) with significantly improved functionality compared to an existing technology, so that the input device is capable of being used as a multi-purpose input tool.

Technical Solution

In order to solve the problem, there is provided an input device for virtual reality (VR) and augmented reality (AR), the input device including: a device body provided at an end a head part to be utilized for VR and AR purposes; an internal sensor embedded in the device body and comprising an accelerometer for sensing a speed and a direction of the device body and at least one position sensor for sensing a position of the device body; an external sensor provided at an outside of the device body and having a touch sensor for sensing touch sensitivity of the head part with respect to a screen of a predetermined electronic device; a controller connected to the internal sensor and the external sensor and configured to control an operation of the electronic device or control implementation of the VR and the AR based on a sensed value of the internal sensor and the external sensor; and a camera provided at one side of the device body and configured to capture an image of a user, wherein the device body comprises a fixed body part and a rotating body part rotatable with respect to the fixed body part and having the camera provided therein, a folding holder foldably provided in the fixed body part, wherein the internal sensor further comprises a vibration motor for feedback, wherein a laser pointer is provided at an end of the head part, wherein the external sensor comprises: a fingerprint sensor used as a tool for authentication when security is required; and a pressure sensor configured to sense pressure sensitivity of the head part with respect to a screen of the electronic device, wherein a writing implement is replacably coupled to the head part, wherein a rechargeable battery is embedded in the device body, and wherein a camera is mounted in a VR display to form a marker in a quick response (QR) code form on a display in a VR or AR state, so that position and shape information of the input device is provided through the position sensor and the marker Advantageous Effects According to the present disclosure, functionality of an input device, such as abilities to be utilized for virtual reality (VR) and augmented reality (AR) purposes, may be significantly improved compared to an existing technology, so that the input device is capable of being utilized as a multi-purpose input tool.

DESCRIPTION OF DRAWINGS

FIG. 1 is an example of use of a general touch pen.
FIG. 2 is a schematic structural diagram of an input device for virtual reality (VR) and augmented reality (AR) according to an embodiment of the present disclosure.
FIG. 3 is a bottom view of a head part shown in FIG. 2.
FIG. 4 is a view in which a writing implement is combined with the input device shown in FIG. 2.
FIG. 5 is a control block diagram of an input device shown in FIG. 2.
FIG. 6 is an example of use of the input device shown in FIG. 2.
FIG. 7 is a schematic structural diagram of an input device for VR and AR according to another embodiment of the present disclosure.
FIG. 8 is an operation diagram of the input device shown in FIG. 7.
FIG. 9 is an example of use of an input device for VR and AR according to yet another embodiment of the present disclosure.
FIG. 10 is a structural diagram of an input device for VR and AR according to yet another embodiment of the present disclosure.

BEST MODE FOR DISCLOSURE

Advantages and features of the present disclosure and a method of achieving the same should become clear with embodiments described in detail below with reference to the accompanying drawings.

However, the present disclosure is not limited to the embodiments disclosed below and may be realized in various other forms.

The present embodiments make the disclosure complete and are provided to completely inform one of ordinary skill in the art to which the present disclosure pertains of the scope of the disclosure. The present disclosure is defined only by the scope of the claims.

Therefore, detailed description of well-known configuration elements, well-known operation and well-known technics will be omitted to avoid obscure interpretation of the present disclosure.

Like reference numerals refer to like elements throughout. Terms used (mentioned) herein are for describing the embodiments and are not intended to limit the present disclosure.

As used herein, the singular forms, "a," "an," and "the" are intended to encompass the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined herein, all terms including technical or scientific terms used herein have the same meanings as commonly understood by those skilled in the art to which the present disclosure pertains.

It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, preferred embodiments of the present disclosure will be described with reference to the accompanying drawings.

FIG. 2 is a schematic structural diagram of an input device for virtual reality (VR) and augmented reality (AR) according to an embodiment of the present disclosure; FIG. 3 is a bottom view of a head part shown in FIG. 2; a view in which a writing implement is combined with the input device shown in FIG. 2; FIG. 5 is a control block diagram of the input device shown in FIG. 2; and FIG. 6 an example of use of the input device shown in FIG. 2.

Referring to the drawings, an input device 100 for VR and AR according to the present embodiment has significantly improved functionality compared to an existing technology. For example, the input device 100 may be utilized for VR and AR purposes. Therefore, the input device 100 may be used as a multi-purpose input tool.

For example, in the case of making a video call, it is possible to bring an effect that a users eyes are looking at a counterpart's face if a video call screen is displayed in front of the camera 160 of the input device 100 according to this embodiment, as shown in FIG. 6. Of course, the example of use as shown in FIG. 6 is visible only to the eyes of the user who is using a VR display G, and for a different person, it seems that the user is talking with holding the camera 160 of the input device 100.

The input device 100 according to the present embodiment may include a device body 110, an internal sensor 130, an external sensor 140, and a controller 180.

The device body 110 is an external structure of the input device 100 according to the present embodiment. The internal sensor 130, the external sensor 140, and the controller 180 may be mounted at an inner side or outer side of the device body 100 at different positions.

The device body 110 may be portable like a pen. At one end of the device body 110, a head part 120 is provided so as to be utilized for VR and AR purposes.

For reference, VR refers to a cutting-edge technology that enables a person to have a realistic experience in a virtual world created by a computer. A user may have such an experience with a head-mounted display (HMD), which a display device to be worn on the user's head.

While the VR creates and shows images, surrounding backgrounds, and objects as virtual images, the AR creates and shows only added information virtually. In other words, the AR is different from the VR in that the actual appearance of the real world is the main feature.

For example, when driving information is added to and displayed on a real road scene in a navigation system, the AR is implemented, and when driving information is shown on a virtual map, the VR is implemented.

The internal sensor 130 is a device mounted inside the device body 110. The internal sensor 130 may include an accelerometer 131 for detecting a speed and a direction of the device body 110, at least one position sensor 132 for detecting a position of the device body 110, and a vibration motor 133 for feedback.

Unlike the accelerometer 131 and the vibration motor 133 for feedback, the position sensor 132 may be provided at both ends of the device body 110.

The external sensor 140 is a device mounted at an outer side of the device body 110. The external sensor 140 senses a user's touch sensitivity with respect to a screen of a predetermined electronic device, performs a function like a mouse clicking when using a PC, and detects an amount of pressure applied by the user so as to be used for an application. In the case of a device having an embedded device, the functions of a touch sensor and a fingerprint recognition sensor may be implemented in the embedded display. The external sensor 140 may include a touch sensor 141 for sensing touch sensitivity of the head part 120 with respect to a screen of a predetermined electronic device, a fingerprint sensor 142 used for a authentication purpose when security is required, and a pressure sensor 143 for sensing pressure sensitivity of the head part 120 with respect to the screen. For reference, the pressure sensor 143 may sense pressure at an end of the device, but may sense a user's touch pressure. The pressure at the end of the device may be implemented with an input algorithm of the accelerometer 131 and a force touch.

In addition, unlike the example shown in FIG. 4 in which the touch sensor 141, the fingerprint sensor 142, and the pressure sensor 143 are exposed outside, the touch sensor 141, the fingerprint sensor 142, and the pressure sensor 143 may be embedded in the input device 100. This may be referred to as a touch display-embedded type. Of course, unlike the drawings, even a camera 160 may also be embedded. This may be called a touch display-embedded type (UDC type).

The device body 110 may have a rechargeable battery 150 embedded therein. Although not shown in the drawings, the battery 150 may be recharged through a 5-pin or C-type charging port provided at an outer wall of the device body 110 or may be wirelessly recharged.

At one side of the device body 110, the camera 160 for capturing an image of a user is provided. For example, a video call as shown in FIG. 6 may be implemented using the camera 160.

A laser pointer 121 may be provided at an end of the head part 120. A separate switch (not shown) may be provided at one side of the device body 110 to operate the laser pointer 121. When the switch is pressed, power is supplied from the battery 150 in the device body 110 to the laser pointer 121 so that a light by the laser pointer 121 can be emitted.

In addition, a writing implement 170 may be replaceably coupled to the head part 120. The writing implement 170 may refer to a pencil or ballpoint pen capable of producing writing.

Meanwhile, the controller 180 may be connected to the internal sensor 130 and the external sensor 140. The controller 180 may control an operation of the electronic device based on a sensed value of the internal sensor 130 and the external sensor 140 or may perform a control to implement \VR) and augmented reality (AR). In addition, the controller 180 may be linked with a communication module 190 so that the input device 100 according to the present embodiment can transmit any performed operation in real time to a user's application, for example, a smart phone or a tablet PC.

The controller 180 performing such a role may include a central processing unit (CPU) 181, a memory 182 (MEMORY), and a support circuit 183.

In this embodiment, the CPU 181 may be any of various computer processors, which is connected to the internal sensor 130 and the external sensor 140 and capable of being industrially applied in order to control an operation of an electronic device or implementation of VR and AR based on a sensed value of the internal sensor 130 and the external sensor.

The memory 182 may be connected to the CPU 181. The memory 182 may be a computer-readable recording medium, which may be installed locally or remotely. The memory 182 may be, for example, at least one or more readily available memories such as a random access memory (RAM), a read only memory (ROM), a floppy disk, a hard disk, or any form of digital storage.

The support circuit 183 may be coupled to the CPU 181 to support typical operations of processor. The support circuit 183 may include a cache, a power supply, a clock circuit, an input/output circuit, a subsystem, and the like.

In this embodiment, the controller 180 may be connected to the internal sensor 130 and the external sensor 140 and may control an operation of an electronic device or implementation of VR and AR based on a sensed value of the internal sensor 130 and the external sensor, and such a series of control processes may be stored in the memory 182. Typically, a software routine may be stored in memory 182. The software routine may also be stored or executed by any other CPU (not shown).

Although the processes according to the present disclosure has been described as being executed by a software routine, it is also possible that at least some of the processes of the present disclosure are performed by hardware. As such, the processes of the present disclosure may be implemented in software executed on a computer system, implemented in hardware such as an integrated circuit, or implemented by a combination of software and hardware.

Hereinafter, an operation of the input device 100 for VR and AR according to the present embodiment will be described.

The input device 100 according to the present embodiment may serve as a writing implement and a pointer. That is, since the accelerometer 131 and the position sensor 132 are mounted, movement of the input device 100 may be detected by the accelerometer 131 and the position sensor 132 to recognize handwritten characters.

As described above, the writing implement 170 may be attached to the head part 120 so as to enable writing in reality. In this case, the writing implement 170 may be an actual writing implement.

In addition, since the laser pointer 121 is provided in the head part 120 of the input device 100 according to the present embodiment, the laser pointer 121 may provide a laser point function in virtual reality and augmented reality. In addition, objects in virtual reality and augmented reality, such as clicking and dragging, may be recognized.

The input device 100 according to the present embodiment may serve as a writing implement and a pointer. The input device 100 may serve as a virtual keyboard and a virtual laptop. That is, based on a position of the input device 100, a user may be able to see a virtual screen and the virtual keyboard.

Movement of a finger on the keyboard may be recognized and processed by the camera 160 embedded in the input device 100 or by the camera of a VR/AR device worn on the user. A reference point may be set with the input device 100 laid down or standing upright. In a case where the input device 100 stands upright, it is possible to easily analyze movement of a user's finger by the camera 160 embedded in the input device 100.

The input device 100 according to the present embodiment may be utilized as a tool for virtual reality and augmented reality video calls.

For example, the position sensor 132 may set a reference point of a screen to be displayed to the user. The screen to be visible to the user sees may be displayed through equipment the user is wearing. Of course, an original screen in the red circle is invisible to outsiders.

An image of the user may be captured by the camera 160 of the input device 100. For example, in the case of making a video call, it is possible to bring an effect that a user's eyes are looking at a counterpart's face if a video call screen is displayed in front of the camera 160 of the input device 100 according to this embodiment as shown in FIG. 6.

Of course, the example of use as shown in FIG. 6 is visible only to the eyes of the user who is using a VR display G, and for a different person, it seems that the user is talking with holding the camera 160 of the input device 100.

According to this embodiment which operates based on the structure as described above, functionality of the input device 100, such as abilities to be utilized for VR and AR purposes, may be significantly improved compared to an existing technology, so that the input device 100 is capable of being used as a multi-purpose input tool.

FIG. 7 is a schematic structural diagram of an input device for virtual reality (VR) and augmented reality (AR) according to another embodiment of the present disclosure, and FIG. 8 is an operation diagram of the input device shown in FIG. 7.

Referring to FIGS. 7 and 8, an input device 200 for VR and AR according to the present embodiment may also include a device body 210, an internal sensor 130 (see FIG. 6), an external sensor 140, a camera 160, and a controller 180 (see FIG. 6). The structures, functions, and roles are the same as in the above-described embodiment. Therefore, a redundant description will be omitted.

Meanwhile, a device body 210 applied to the input device 200 according to this embodiment may include a fixed body part 210a and a rotating body part 210b rotatable with respect to the fixed body part 210a.

The camera 160 may be mounted in the rotating body part 210b. Therefore, in a case where the input device 200 according to this embodiment is fixed in a certain place, it is possible to set a position of the camera 160 while rotating the rotating body 210b, thereby providing user convenience.

In addition, a folding holder 290 may be provided in the device body 210 of the input device 200 according to this embodiment.

When the folding holder 290 is tilted as shown in FIG. 8, there is an advantage in that the input device 200 according to the present embodiment is able to stand.

Even if this embodiment is applied, functionality of the input device 200, such as abilities to be utilized for VR and AR purposes, may be significantly improved compared to an existing technology, so that the input device 200 is capable of being used as a multi-purpose input tool.

FIG. 9 is an example of use of an input device for VR and AR according to yet another embodiment of the present disclosure. Referring to FIG. 9, a camera C may be mounted in a VR display G. In this case, by creating a marker in the form of a quick response (QR) code on a display in a VR/AR state, it is possible to provide accurate position and shape information of an input device 300 using a position sensor and the marker.

FIG. 10 is a structural diagram of an input device for VR and AR according to yet another embodiment of the present disclosure. As shown in FIG. 10, for example, by using a holder 410 in a truncated cone shape, standing or wireless charging of the device 100 may be possible, and it should be understood that these all fall within the scope of the present disclosure.

While the present disclosure has been particularly shown and described with reference to preferred embodiments thereof, it will be understood by those skilled in the art that various changes in form and details may be made therein without departing from the spirit and scope of the present disclosure as defined by the appended claims. Therefore, it should be said that such modifications or variations fall within the scope of the claims of the present disclosure.

[Detailed Description of Main Elements]

| | |
|---|---|
| 100: input device | 110: device body |
| 120: head part | 121: laser pointer |
| 130: internal sensor | 131: accelerometer |
| 132: position sensor | 133: vibration motor for feedback |
| 140: external sensor | 141: touch sensor |
| 142: fingerprint sensor | 143: pressure sensor |
| 150: battery | 160: camera |
| 170: writing implement | 180: controller |
| 190: communication module | |

The invention claimed is:

1. An input device for virtual reality (VR) and augmented reality (AR), the input device comprising:
   a device body provided at an end thereof a head part to be utilized for VR and AR purposes;
   an internal sensor embedded in the device body and comprising an accelerometer for sensing a speed and a direction of the device body and at least one position sensor for sensing a position of the device body;
   an external sensor provided at an outside of the device body and having a touch sensor for sensing touch sensitivity of the head part with respect to a screen of a predetermined electronic device;
   a controller connected to the internal sensor and the external sensor and configured to control an operation of the electronic device or control implementation of the VR and the AR based on a sensed value of the internal sensor and the external sensor; and
   a camera provided at one side of the device body and configured to capture an image of a user,
   wherein the device body comprises a fixed body part and a rotating body part rotatable with respect to the fixed body part and having the camera provided therein,
   a folding holder foldably provided in the fixed body part,
   wherein the internal sensor further comprises a vibration motor for feedback,
   wherein a laser pointer is provided at an end of the head part,
   wherein the external sensor comprises:
   a fingerprint sensor used as a tool for authentication when security is required; and
   a pressure sensor configured to sense pressure sensitivity of the head part with respect to a screen of the electronic device,
   wherein a writing implement is replacably coupled to the head part,
   wherein a rechargeable battery is embedded in the device body,
   wherein a camera is mounted in a VR display to form a marker in a quick response (QR) code form on a display in a VR or AR state, so that position and shape information of the input device is provided through the position sensor and the marker, and
   wherein the controller is configured to display a video call screen in front of the camera of the input device when making a video call such that a user's eyes look at a counterpart's face through the VR display.

* * * * *